Feb. 8, 1949. F. C. TODD 2,461,131
ELECTRICAL CIRCUIT
Filed June 15, 1946
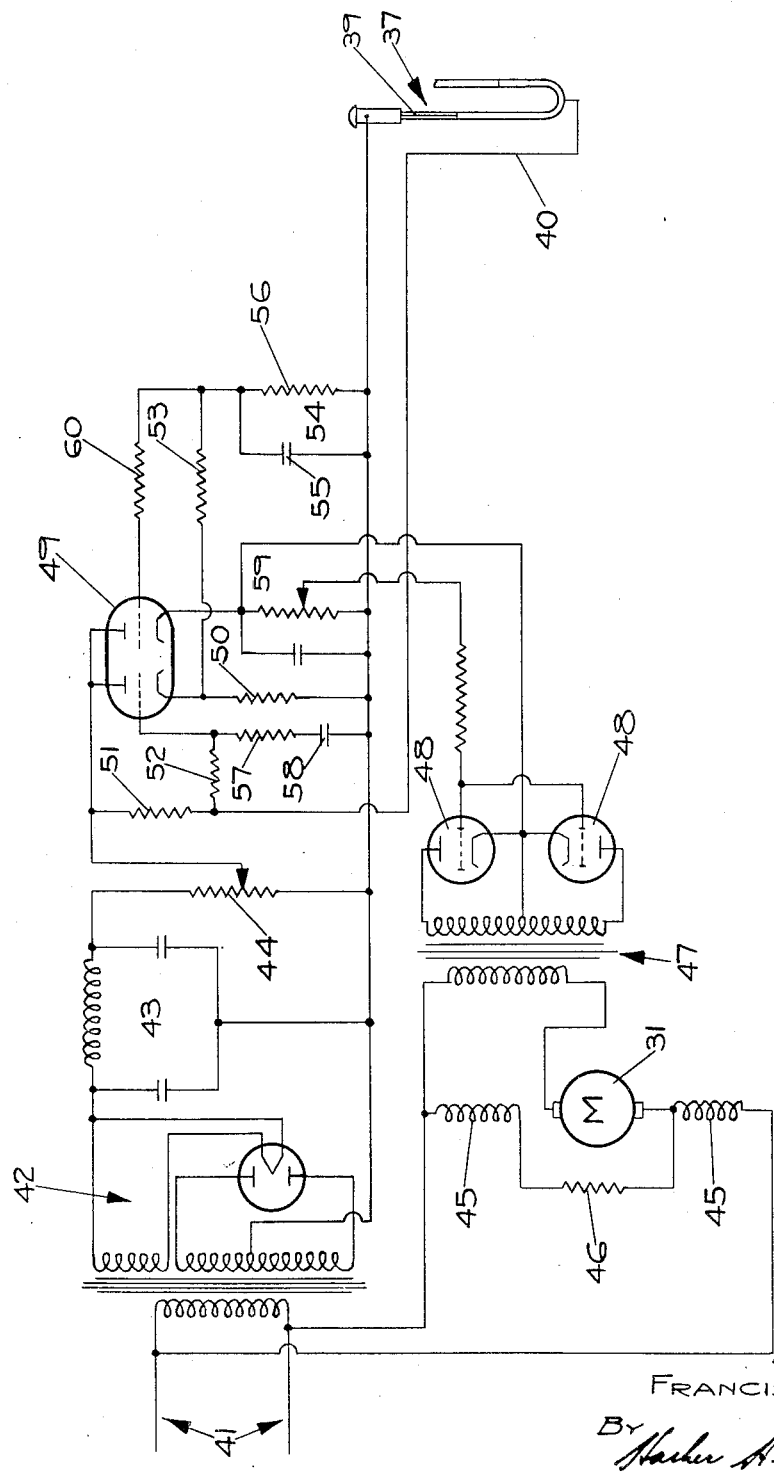
INVENTOR:
FRANCIS C. TODD,
BY
ATT'Y.

Patented Feb. 8, 1949

2,461,131

UNITED STATES PATENT OFFICE 2,461,131

ELECTRICAL CIRCUIT

Francis C. Todd, Columbus, Ohio, assignor to The Jeffrey Manufacturing Company, a corporation of Ohio Application June 15, 1946, Serial No. 676,883

1 Claim. (Cl. 318—343)

This invention relates to an electrical circuit and more specifically to an electrical circuit for controlling the speed of an electric motor in a predetermined manner.

An object of the invention is to provide an electrical circuit which will respond to sudden changes in one circuit condition, such as the opening and closing of a switch, to produce smooth or gradual variation in the speed of rotation of an electric motor or, more broadly, to produce such gradual or smooth variations in the flow of an electrical current.

Another object of the invention is to provide an electrical circuit comprising a time delay circuit preferably including a condenser and a shunting high resistance rheostat or resistor for controlling flow of electrical current preferably with the consequent control of the speed of rotation of an electric motor so that said controlling electrical current and said motor speed vary gradually in response to successive opening and closing of a control switch for the circuit.

Other objects of the invention will appear hereinafter, the novel features and combinations being set forth in the appended claim.

The accompanying single figure of drawing constitutes the wiring diagram of the system of my invention.

The electrical circuit herein disclosed was designed particularly for use in connection with the High Frequency Jig disclosed and claimed in the application of Frank P. Smith, Serial No. 668,845, filed May 10, 1946, though it may be used with other devices.

In the drawing there is shown a manometer type switch 37 which is merely representative of any switch which opens and closes the control circuit or which abruptly changes the resistance thereof. This is the adjustable controlling element of the control system. The final driven element of the system is the motor 31, and the system functions so that in response to opening and closing of the switch 37 successively the speed of the motor 31 will vary gradually or in a smooth manner. To effect this desired control is the function of the complete electrical system.

Alternating current is supplied from a desired source to conductors 41 which feed a full-wave rectifier 42 and associated filter 43, the output of which is delivered to a high resistance potentiometer 44.

Conductors 41 also supply split fields 45 of a Merle-Karff type series alternating current motor 31 which has a resistor 46 connected in series with said fields.

The rate of rotation of the motor 31 is controlled by placing a variable impedance in series with the armature thereof, this variable impedance being in the form of the secondary of a transformer 47. The current delivered to said secondary of the transformer is controlled by controlling the grid voltage on a pair of vacuum or electron-discharge tubes 48 connected across the terminals of the primary of said transformer 47, as clearly illustrated in the drawing.

To produce a variable and gradually changing voltage on the grids of tubes 48 I provide a double electron-discharge tube 49, the left hand portion of which derives cathode-anode voltage from a variable tap on the potentiometer 44 over an obvious circuit which includes resistor 50 in series with the cathode. This resistor 50 may have a value, for example, of approximately 500,000 ohms.

When the manometer switch 37 is open, the control grid of the left-hand half of tube 49 will be in effect connected to said plate by way of resistors 51 and 52. Under such conditions the current flow through resistor 50, which is the cathode-anode current of said left-hand portion of tube 49, will be a maximum.

The voltage thus developed across resistor 50 is supplied through an obvious circuit, including resistor 53, to a floating time control circuit 54 which includes a relatively large condenser 55 and a relatively high ohm resistor 56 in parallel. As an illustration of workable values, resistor 53 may have 4,000,000 ohms and resistor 56 may have 5,000,000 ohms. Obviously when there is voltage across resistor 50 because of a cathode-anode current flow through the left-hand portion of tube 49, the condenser 55 will tend to charge and this charge will build up at a relatively slow rate so long as said voltage persists. On the other hand, as soon as this charging voltage disappears from resistor 50, the charge on condenser 55 will gradually decrease since it will discharge through the resistor 56 in parallel with the two resistors 50 and 53 in series. Because of this fact the discharge rate of the condenser 55 will be greater than its charging rate and this is desirable because, as hereinafter described, for constant load the speed of the motor 31 is directly proportional to the charge on condenser 55 and it may be desired to increase the speed of said motor 31 at a faster rate than it decreases.

When the manometer switch 37 closes its contacts, a negative charge is put on the grid of the left-hand portion of tube 49 since resistor 51 is thus connected directly across the portion of potentiometer 44 which is being used. This closing of manometer switch 37 will also effectively connect grid condenser 58 and grid resistor 57 in parallel with the megohm resistor 52.

It is thus seen that resistor 50 is a follow resistor in that the voltage drop across it is either a maximum or a minimum, depending upon whether manometer switch 37 is open or closed.

The right-hand side of tube 49 includes follower resistor 59 connected in its cathode-anode circuit, and the current flow through this resistor 59 and thus the voltage drop across it is directly proportional to the charge which exists on the time control circuit 54, or, in other words, the charge on condenser 55. This charge on condenser 55 is applied to the grid of the right-hand portion of tube 49 through a grid resistor 60. Thus there is a smooth variation in the flow of current through the follower resistor 59 directly proportional to the fluctuations of the charge on condenser 55, as switch 37 is successively opened and closed.

Resistor 59 is employed as a potentiometer and a variable portion of the voltage drop thereacross is applied to the grids of the control vacuum or electron-discharge tubes 48 over an obvious circuit whereby the current flow in the transformer 47 is directly proportional to this voltage drop across said resistor 59 which in turn is directly proportional to the charge on condenser 55.

It is thus evident that by controlling the opened and closed condition of the manometer switch 37 there is a gradual change produced in the speed of the motor 31. Furthermore it is to be noted that the time circuit 54 will automatically continue gradually increasing the speed of the motor 31 or decreasing it until a changed condition is produced by the switch 37 changing from open to closed condition or vice versa, or, in other words, by its successive opening and closing. Thus an abrupt change of the voltage on the grid of the left-hand portion of tube 49, such as no-voltage followed by full voltage, then followed by no-voltage, due to successive opening and closing of switch 37 will result in smooth or gradual variations in the current in the armature winding of motor 31 and consequent smooth or gradual variations in its speed, both when increasing and decreasing said speed.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

An electrical circuit including a variable speed electric motor, means for slowly and variably adjusting the speed of said motor including a normally closed motor circuit including the secondary winding of a transformer, means for smoothly varying the current delivered to said secondary winding including a primary winding connected to the output circuit of an electron-discharge tube having a grid-cathode control circuit with a resistor therein, means for smoothly varying the voltage across said resistor including a second electron-discharge tube in whose output circuit said resistor is connected, a control circuit for said second electron-discharge tube including a floating time control circuit provided by a condenser and high resistance shunt resistor, and switch controlled circuit means for charging said condenser and removing it to discharge through said resistance shunt.

FRANCIS C. TODD.

REFERENCES CITED

The following references are of record in the file of this patent:

UNITED STATES PATENTS

| Number | Name | Date |
|---|---|---|
| 2,359,308 | Grabau | Oct. 3, 1944 |
| 2,407,654 | Deserno | Sept. 17, 1946 |
| 2,410,233 | Percival | Oct. 29, 1946 |